United States Patent
Michelet et al.

(10) Patent No.: US 9,695,961 B2
(45) Date of Patent: Jul. 4, 2017

(54) DOUBLE CLAMPING COLLAR FIXING SYSTEM

(71) Applicant: Airbus Operations (SAS), Toulouse (FR)

(72) Inventors: Luc Michelet, Cornebarrieu (FR); Laurent Rebolloso, Le Gres (FR); Davide Faggella, Pelleport (FR); Benjamin Lafont, Launaguet (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 15/003,401

(22) Filed: Jan. 21, 2016

(65) Prior Publication Data

US 2016/0215902 A1   Jul. 28, 2016

(30) Foreign Application Priority Data

Jan. 27, 2015   (FR) ..................... 15 50593

(51) Int. Cl.
*F16L 3/08* (2006.01)
*F16L 3/12* (2006.01)
*H02G 3/32* (2006.01)

(52) U.S. Cl.
CPC ............ *F16L 3/085* (2013.01); *F16L 3/1222* (2013.01); *H02G 3/32* (2013.01)

(58) Field of Classification Search
CPC . F16L 3/085; F16L 3/1222; F16L 3/02; F16L 3/08; F16L 3/1058; F16L 3/12; F16L 3/1226; F16L 3/137; F16L 3/22; F16L 3/221; F16L 3/223; F16L 3/237

USPC .................. 248/68.1, 74.3, 70; 403/192, 198
See application file for complete search history.

(56) References Cited

U.S. PATENT DOCUMENTS

| | | | | |
|---|---|---|---|---|
| 2,876,027 A | * | 3/1959 | Sulmonetti | ............... F16B 2/10 248/229.15 |
| 4,640,479 A | * | 2/1987 | Shely | ................... H02G 3/0641 16/2.2 |
| 5,098,047 A | * | 3/1992 | Plumley | ................ F16L 3/2235 248/68.1 |
| 5,123,619 A | | 6/1992 | Tomlinson et al. | |
| 5,443,232 A | * | 8/1995 | Kesinger | ................ H02G 3/263 248/62 |

(Continued)

OTHER PUBLICATIONS

French Search Report, Nov. 17, 2015, priority document.

*Primary Examiner* — Christopher E Garft
(74) *Attorney, Agent, or Firm* — Greer, Burns & Crain, Ltd.

(57) ABSTRACT

A fixing system allowing an element that is to be supported to be fixed to a support element. The fixing system comprises a first fixing element configured to be positioned and fixed on the support element and having a cylindrical exterior surface, a clamping collar configured to be positioned on the element that is to be supported, a connecting piece comprising a first part configured to conform to the shape of the exterior surface and a second part, a first securing arrangement configured to secure the first part and the fixing element, and a second securing arrangement configured to secure the second part and the clamping collar while at the same time allowing the clamping collar to rotate about an axis of rotation. Such a fixing system allows easy installation of the various constituent elements at the time of assembly.

7 Claims, 3 Drawing Sheets

(56) References Cited

U.S. PATENT DOCUMENTS

| | | | |
|---|---|---|---|
| 8,991,774 B2* | 3/2015 | Hajduch | B65D 63/00 248/220.22 |
| 2011/0073728 A1 | 3/2011 | Blackwell | |

* cited by examiner

DOUBLE CLAMPING COLLAR FIXING SYSTEM

CROSS-REFERENCES TO RELATED APPLICATIONS

This application claims the benefit of the French patent application No. 1550593 filed on Jan. 27, 2015, the entire disclosures of which are incorporated herein by way of reference.

BACKGROUND OF THE INVENTION

The present invention relates to a fixing system.

An element that is to be supported, such as a cable or a pipe, is generally fixed to a support element, such as an element of a structure, by fitting one or more self-locking ties, for example of the Ty-Rap® type, each simultaneously passing around the element that is to be supported and the support element.

Such a fixing is simple and particularly suitable when the element that is to be supported is in contact with the support element. However, such a fixing is not suitable when the element that is to be supported and the support element are distant from one another.

When the element that is to be supported and the support element are not parallel to one another, they can be fixed using a pivoting double clamping collar. Such a device has two clamping collars joined together via a pivot connection. Fitting and tightening each clamping collar may prove particularly tricky because each clamping collar needs to be correctly positioned so that after each has been tightened, there is no force that will stress and deform the support element or the element that is to be supported.

SUMMARY OF THE INVENTION

It is an object of the present invention to provide a fixing system that does not have the disadvantages of the prior art and that, in particular, allows easy installation between a support element and an element that is to be supported.

There is therefore proposed a fixing system allowing an element that is to be supported to be fixed to a support element, the fixing system comprising:
- a fixing element configured to be positioned and fixed on the support element and having a cylindrical exterior surface,
- a clamping collar configured to be positioned on the element that is to be supported,
- a connecting piece comprising a first part configured to conform to the shape of the exterior surface of the fixing element and a second part,
- a first securing arrangement configured to secure the first part of the connecting piece and the fixing element, and
- a second securing arrangement configured to secure the second part of the connecting piece and the clamping collar while at the same time allowing the clamping collar to rotate about an axis of rotation.

Such a fixing system allows easy installation of the various constituent elements at the time of assembly.

Advantageously, the first securing arrangement comprises at least one self-locking tie and the first part of the connecting piece has, for each self-locking tie, at least one carrier loop through which the self-locking tie is inserted.

Advantageously, the second securing arrangement takes the form of a screw or of a stud which passes through a lug of the clamping collar and is fixed into the second part of the connecting piece.

Advantageously, the fixing system comprises an indexing arrangement configured to preposition the first part of the connecting piece on the exterior surface in predetermined angular positions.

Advantageously, the indexing arrangement comprises first crenulations produced along at least one of the circular edges of the exterior surface of the fixing element and oriented towards the exterior surface, and second crenulations produced along at least one of the edges of the first part of the connecting piece and configured to engage with the first crenulations.

Advantageously, the fixing element is made up of two half-shells configured to sandwich the support element, and the fixing system comprises a clamping element configured to clamp the two half-shells around the support element.

Advantageously, the clamping element is one or more self-locking ties which pass around the two half-shells.

Advantageously, each half-shell has, for the sole or each self-locking tie, a groove arranged under the first part of the connecting piece and in which the self-locking tie is positioned.

BRIEF DESCRIPTION OF THE DRAWINGS

The abovementioned features of the invention, together with others, will become more clearly apparent from reading the following description of one embodiment, the description being given in conjunction with the attached drawings among which.

DETAILED DESCRIPTION OF THE PREFERRED EMBODIMENTS

Figure 1:
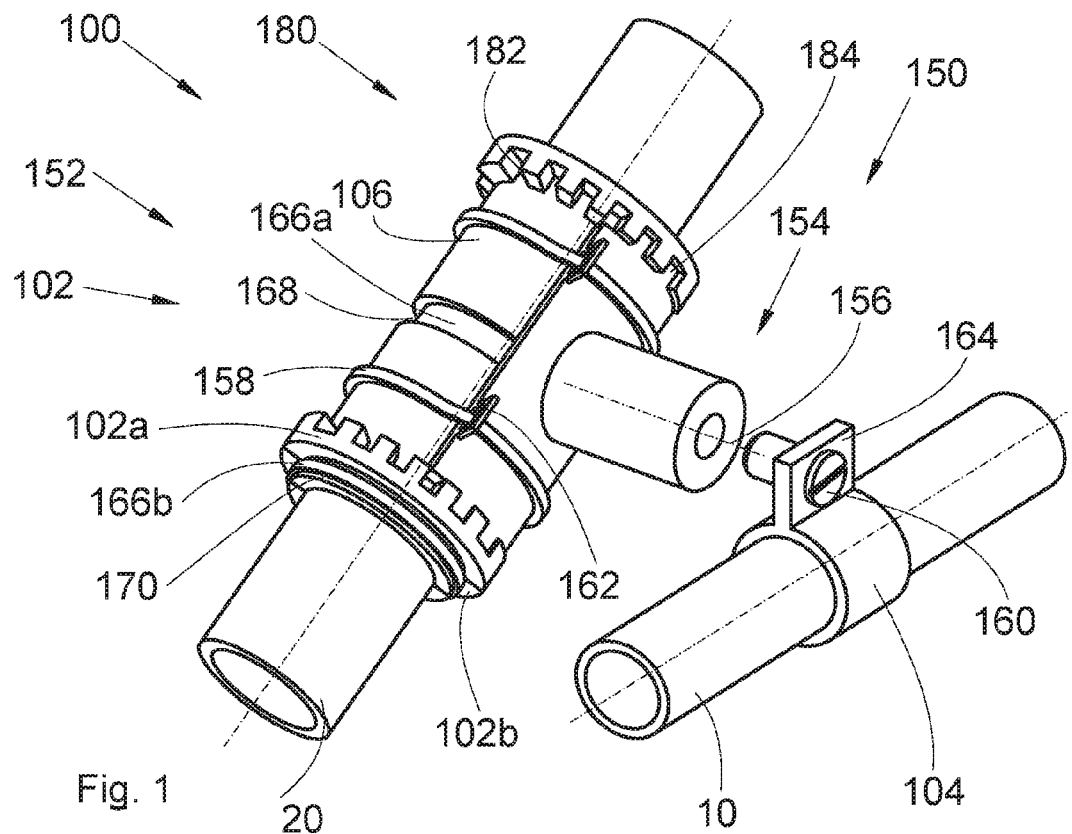
FIG. 1 is a perspective view of a fixing system according to the invention.
Figure 2:
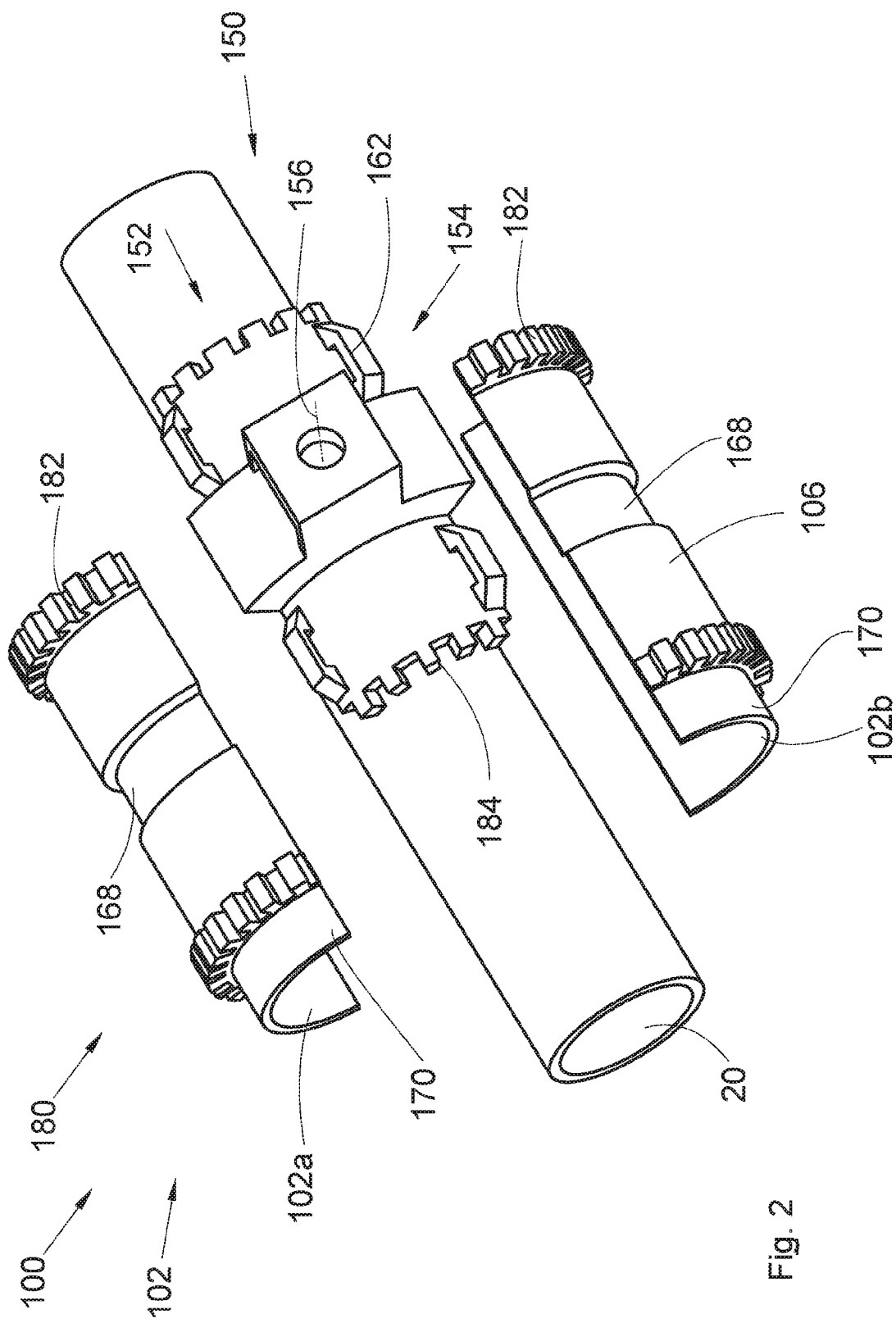
FIG. 2 is an exploded perspective view of the fixing system according to FIG. 1.

FIG. 1 and FIG. 2 show a fixing system 100 for fixing an element that is to be supported 10 to a support element 20. In the invention embodiment depicted in FIGS. 1 and 2, the element that is to be supported 10 is a pipe, but it could adopt some other form such as, for example, a cable or any other element that is to be fixed. Likewise, the support element 20 adopts the form of a tube, but could have some other shape.

The fixing system 100 comprises a fixing element 102 configured to be positioned and fixed on the support element 20 and a clamping collar 104 configured to be positioned and possibly fixed to the element that is to be supported 10. The fixing element 102 has a cylindrical exterior surface 106 of radius R.

The fixing system 100 also comprises a connecting piece 150 configured to allow the clamping collar 104 to be fixed to the fixing element 102 while at the same time allowing the clamping collar 104 to rotate about an axis of rotation 156.

The connecting piece 150 comprises a first part 152 and a second part 154.

The first part 152 of the connecting piece 150 is configured to conform to the shape of the exterior surface 106 and in this instance takes the form of a shell in the shape of an arc of a cylinder of radius R.

The fixing system 100 also comprises a first securing arrangement 158 configured to secure the first part 152 of the connecting piece 150 and the fixing element 102.

The second part 154 of the connecting piece 150 is configured to allow the clamping collar 104 to be fixed to the connecting piece 150 and takes the form of a post fixed radially to the shell in FIG. 1 and the form of a raised plateau fixed radially to the shell in FIG. 2.

The fixing system 100 also comprises a second securing arrangement 160 configured to secure the second part 154 of the connecting piece 150 and the clamping collar 104 while at the same time allowing the clamping collar 104 to rotate about the axis of rotation 156.

Installation of the fixing system 100 therefore comprises:
positioning and fixing the fixing element 102 on the support element 20,
positioning the clamping collar 104 on the element that is to be supported 10,
fixing the clamping collar 104 on the second part 154 of the connecting piece 150 using the second securing arrangement 160,
positioning the first part 152 of the connecting piece 150 on the exterior surface 106 in a suitable angular position according to the position of the element that is to be supported 10 by causing the first part 152 of the connecting piece 150 to slide angularly on the exterior surface 106, and
fixing the first part 152 of the connecting piece 150 to the exterior surface 106 using the first securing arrangement 158.

Such a fixing system 100 is therefore easy to install because all that is required is for the fixing element 102 to be placed on the support element 20 and then for the clamping collar 104 already mounted on the element that is to be supported 10 to be brought into position and fixed to the second part 154 of the connecting piece 150 using the second securing arrangement 160. The rotation permitted by the second securing arrangement 160 and the angular sliding of the first part 152 of the connecting piece 150 on the exterior surface 106 prevent any stress from being introduced as the various elements of the fixing system 100 are installed and fixed. Furthermore, it is possible for the first part 152 of the connecting piece 150 to be positioned freely according to the surroundings and the relative positions of the element that is to be supported 10 and of the support element 20, and by modifying the length of the second part 154 of the connecting piece 150 it is possible to adapt the fixing system 100 to suit various configurations.

The first securing arrangement 158 here comprises at least one self-locking tie for example of the Ty-Rap® type. In order to hold each self-locking tie 158 in position and thus make it easier to tighten, the first part 152 of the connecting piece 150 has, for each self-locking tie 158, at least one carrier loop 162 through which the self-locking tie 158 is inserted prior to the mounting of the fixing system 100.

For preference, there are two carrier loops 162 per self-locking tie 158, the two carrier loops 162 being positioned on the two edges of the first part 152 of the connecting piece 150.

The second securing arrangement 160 takes the form of a screw which passes through a lug 164 of the clamping collar 104 and is screwed into the second part 154 of the connecting piece 150 into a bore provided for that purpose. According to the tightness of the screw, the clamping collar 104 can pivot about the axis of the screw 160.

The second securing arrangement 160 may also adopt the form of a stud passing through the lug 164 and fixed into the second part 154 of the connecting piece 150, for example using clips.

The axis of rotation 156 here is radial with respect to the exterior surface 106, but it could adopt some other orientation according to the position in which the clamping collar 104 is fixed.

In order to position the first part 152 of the connecting piece 150 on the exterior surface 106 in predetermined angular positions, the fixing system 100 has an indexing arrangement 180 which allows the first part 152 of the connecting piece 150 to be prepositioned before it is fixed in place by the first securing arrangement 158.

In the invention embodiment shown in FIGS. 1 and 2, the indexing arrangement 180 comprises first crenulations 182. The first crenulations 182 are produced along at least one of the circular edges of the exterior surface 106 and are oriented towards the exterior surface 106, namely towards the first part 152 of the connecting piece 150.

The indexing arrangement 180 also comprises second crenulations 184 which are produced along at least one of the edges of the first part 152 of the connecting piece 150 and which are configured to engage with the first crenulations 182.

In this instance there are first crenulations 182 at each end of the fixing element 102 and the exterior surface 106 is thus delimited between these first crenulations 182, and there are second crenulations 184 at each end of the first part 152 of the connecting piece 150.

The fixing element 102 may be fixed on the support element 20 in any suitable way, for example by bonding, force-fitting, etc.

According to one particular embodiment of the invention, the fixing element 102 is made up of two half-shells 102a-b that complement one another and are configured to sandwich the support element 20.

In that case, the fixing element 102 also has a clamping element 166a-b configured to clamp the two half-shells 102a-b around the support element 20. The clamping element 166a-b may for example be a binding screw.

In the invention embodiment set out here, the clamping element 166a-b is one or more self-locking ties which pass around the two half-shells 102a-b.

The self-locking ties 166b may be positioned away from the position of the first part 152 of the connecting piece 150 and each half-shell 102a-b then has, for each self-locking tie 166b, a seat 170 on which the self-locking tie 166b presses.

The self-locking ties 166a may be arranged under the first part 152 of the connecting piece 150. For that purpose, each half-shell 102a-b has, under the first part 152 of the connecting piece 150 and for each self-locking tie 166a, a groove 168 in which the self-locking tie 166a is positioned.

Figure 3:
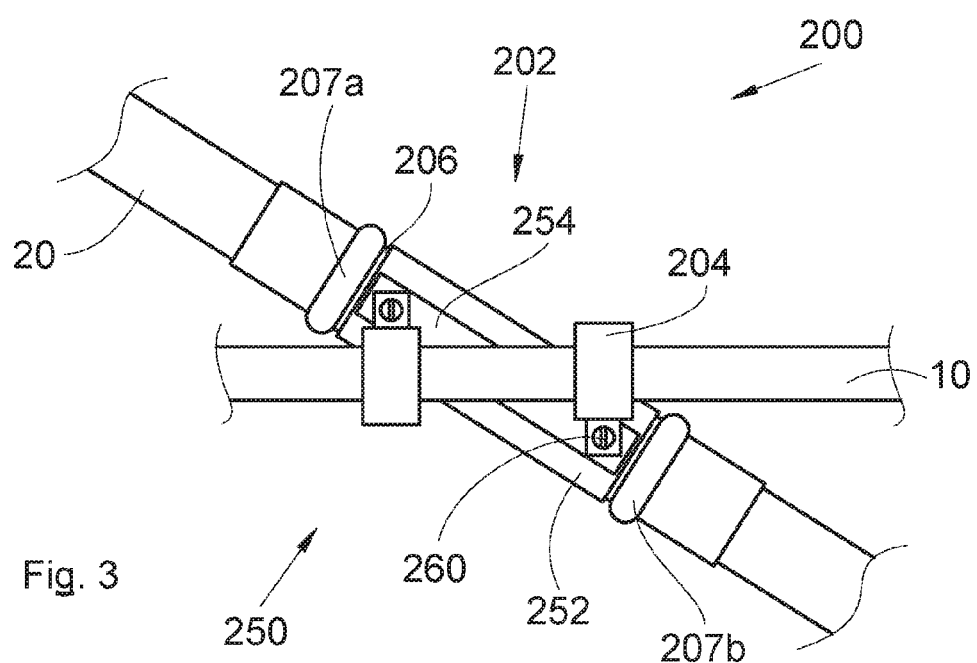
FIG. 3 is a front view of a fixing system.

FIG. 3 shows a fixing system 200 that allows an element that is to be supported 10 to be fixed to a support element 20.

The fixing system 200 comprises:
a fixing element 202 configured to be positioned and fixed on the support element 20 and having an exterior surface 206,
at least one clamping collar 204 configured to be positioned on the element that is to be supported 10, and
a connecting piece 250 comprising a first part 252 configured to conform to the shape of the exterior surface 206 and a second part 254.

The fixing element 202 is pushed onto the support element 20 and the exterior surface 206 is axially delimited by two end stops 207a and 207b.

Each clamping collar 204 here adopts the form of an open cylindrical collar into which the element that is to be supported 10 is closely fitted.

The first part 252 of the connecting piece 250 takes the form of a sleeve closely fitted onto the exterior surface 206. To allow it to be installed, the sleeve may be split longitudinally and may be elastic enough that it clamps the fixing element 202.

The second part 254 of the connecting piece 250 takes the form of a spacer which extends radially from the first part 252 of the connecting piece 250.

The first part 252 of the connecting piece 250 is fixed to the fixing element 202 axially via the two end stops 207a and 207b, and rotationally by the clamping of the elastic sleeve.

To secure the second part 254 of the connecting piece 250 and the clamping collar 204, the fixing system 200 comprises a securing arrangement 260 which here take the form of a binding screw.

The exterior surface 206 is cylindrical but may also adopt the shape of a faceted prism.

Figure 4:
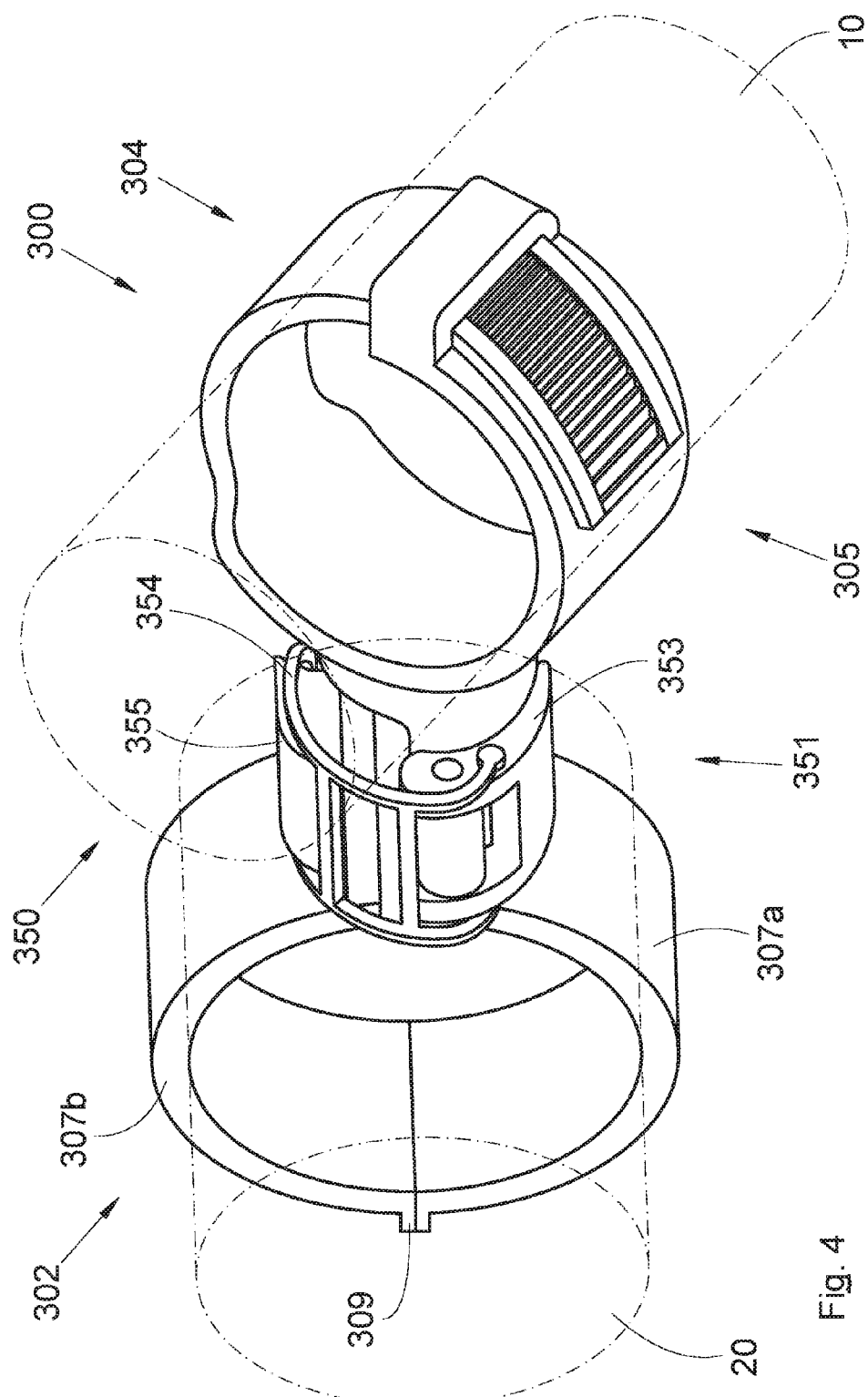
FIG. 4 is a perspective view of a fixing system.

FIG. 4 shows a fixing system 300 for fixing an element that is to be supported 10 to a support element 20.

The fixing system 300 comprises:
a fixing element 302 configured to be positioned and fixed on the support element 20,
a clamping collar 304 configured to be positioned on the element that is to be supported 10, and
a connecting piece 350 providing the rigid connection between the fixing element 302 and the clamping collar 304.

The fixing element 302 and the clamping collar 304 have a closure arrangement that allows them to open up to allow the element 20, 10 to be introduced and close up and lock to trap the element 20, 10 and clamp it so that it is fixed there.

The clamping collar 304 here takes the form of a self-locking tie 305 which constitutes the closure arrangement of the clamping collar 304.

The fixing element 302 comprises a first half-cylinder 307a and of a second half-cylinder 307b fixed to one another by a hinge 309 the axis of which is parallel to the axis of the fixing element 302.

One of the half-cylinders 307a is fixed to the connecting piece 350 and the other half-cylinder 307b is therefore free to pivot about the hinge 309 to allow the support element 20 to be installed.

The closure arrangement of the fixing element 302 here comprises an attachment system 351 which comprises a lever 353 mounted with the ability to rotate on the connecting piece 350, a hook 354 mounted with the ability to rotate on the lever 353, and a spur 355 secured to the second half-cylinder 307b.

In the closed position, the hook 354 collaborates with the spur 355 and the lever 353 is positioned in such a way as to pull against the hook 354 thereby pressing it firmly against the spur 355 and locking the fixing element 302.

To release the second half-cylinder 307b, the lever 355 is operated in such a way as to release the hook 354 which can free itself of the spur 355, allowing the fixing element 302 to open.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A fixing system allowing an element that is to be supported to be fixed to a support element, said fixing system comprising:
a fixing element configured to be positioned and fixed on the support element and having a cylindrical exterior surface,
a clamping collar configured to be positioned on the element that is to be supported,
a connecting piece incrementally indexable about the cylindrical exterior surface to pre-position the connecting piece on the cylindrical exterior surface of the fixing element in predetermined angular positions and comprising a first part configured to conform to the shape of the cylindrical exterior surface and a second part,
a first securing arrangement configured to secure the first part of the connecting piece and the fixing element,
an indexing arrangement configured to pre-position the first part of the connecting piece on the exterior surface in predetermined angular positions wherein the indexing arrangement comprises first crenulations produced along a circumferential edge of the exterior surface and oriented towards said exterior surface, and second crenulations produced along at least one terminal edge of the first part of the connecting piece and configured to engage with the first crenulations, and
a second securing arrangement configured to secure the second part of the connecting piece and the clamping collar while at the same time allowing the clamping collar to rotate about an axis of rotation.

2. The fixing system according to claim 1, wherein the first securing arrangement comprises at least one self-locking tie and wherein the first part of the connecting piece has, for each self-locking tie, at least one carrier loop through which the self-locking tie is inserted.

3. The fixing system according to claim 1, wherein the second securing arrangement takes the form of a screw or of a stud which passes through a lug of the clamping collar and is fixed into the second part of the connecting piece.

4. The fixing system according to claim 1, wherein the fixing element is made up of two half-shells configured to sandwich the support element, and wherein the fixing system comprises a clamping element configured to clamp the two half-shells around the support element.

5. The fixing system according to claim 4, wherein the clamping element comprises a self-locking tie which passes around the two half-shells.

6. The fixing system according to claim 5, wherein each half-shell has, for a sole or the self-locking tie, a groove arranged under the first part of the connecting piece and in which the self-locking tie is positioned.

7. The fixing system according to claim 1, wherein the connecting piece is incrementally indexable about the cylindrical exterior surface to pre-position the connecting piece on the cylindrical exterior surface of the fixing element in greater than two predetermined angular positions.

* * * * *